United States Patent
Yamamoto

(10) Patent No.: US 8,696,452 B2
(45) Date of Patent: Apr. 15, 2014

(54) GAME SYSTEM, CONTROL METHOD OF CONTROLLING COMPUTER AND A STORAGE MEDIUM STORING A COMPUTER PROGRAM USED THEREOF

(75) Inventor: Takao Yamamoto, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/634,523

(22) PCT Filed: Mar. 11, 2011

(86) PCT No.: PCT/JP2011/055829
§ 371 (c)(1),
(2), (4) Date: Sep. 12, 2012

(87) PCT Pub. No.: WO2011/115019
PCT Pub. Date: Sep. 22, 2011

(65) Prior Publication Data
US 2013/0005464 A1    Jan. 3, 2013

(30) Foreign Application Priority Data

Mar. 15, 2010  (JP) ................. 2010-058117

(51) Int. Cl.
*G06F 17/00* (2006.01)
(52) U.S. Cl.
USPC .......................................................... 463/31
(58) Field of Classification Search
USPC ......................................... 463/30–35, 40–42
See application file for complete search history.

(56) References Cited

U.S. PATENT DOCUMENTS

| 6,225,547 | B1 | 5/2001 | Toyama et al. | |
|---|---|---|---|---|
| 7,884,822 | B2 * | 2/2011 | Saito et al. | 345/427 |
| 8,094,153 | B2 * | 1/2012 | Saito et al. | 345/427 |
| 2007/0052712 | A1 * | 3/2007 | Saito et al. | 345/473 |
| 2009/0137296 | A1 | 5/2009 | Takahashi et al. | |
| 2011/0092281 | A1 * | 4/2011 | Saito et al. | 463/30 |
| 2013/0079137 | A1 * | 3/2013 | Yamamoto et al. | 463/31 |
| 2013/0116047 | A1 * | 5/2013 | Yamamoto et al. | 463/31 |

FOREIGN PATENT DOCUMENTS

| JP | 2001-96061 A | 4/2001 |
|---|---|---|
| JP | 2001-246167 A | 9/2001 |
| JP | 2006-325885 A | 12/2006 |
| JP | 2007-181650 A | 7/2007 |

OTHER PUBLICATIONS

International Search Report (date of mailing Jun. 14, 2011).

(Continued)

*Primary Examiner* — Ronald Laneau
(74) *Attorney, Agent, or Firm* — Howard & Howard Attorneys PLLC

(57) ABSTRACT

Disclosed is a game system comprising a monitor (3) that outputs the game screen display, a touch panel (5), and an external memory device (20) that stores sequence data (28) which records the operation timing for touch operation of a touch panel (5). Furthermore, the game system displays objects (60) corresponding to each operation timing within the predetermined time range on a game screen (50) and displays a judgment line (65) that corresponds to the current time and moves within the game screen (50), such that the judgment line (65) traverses in order each object (60) at the operation timing recorded in the sequence data (28). The game system also alters at least either the judgment line (65) movement direction or movement speed according to predetermined conditions.

10 Claims, 13 Drawing Sheets

(56) References Cited

OTHER PUBLICATIONS

Chinese Office Action with English Translation—Issued Jul. 26, 2013.

Korean Office Action with English Translation—Issued Oct. 14, 2013.

\* cited by examiner

GAME SYSTEM, CONTROL METHOD OF CONTROLLING COMPUTER AND A STORAGE MEDIUM STORING A COMPUTER PROGRAM USED THEREOF

CROSS REFERENCE TO RELATED APPLICATION

This application is a national stage application of PCT/JP2011/055829, filed Mar. 11, 2011, which claims priority to Japanese Patent Application No. 2010-058117, filed Mar. 15, 2010, the disclosures of which are hereby incorporated by reference in their entirety.

TECHNICAL FIELD

The present invention relates to a game system that indicates an operation timing of an operating unit disposed in an input device to a player, a control method of controlling a computer and a storage medium storing a computer program used thereof.

BACKGROUND ART

There have been known game machines in which an operation timing is guided by displaying a note bar corresponding to a rhythm sound along a predetermined path and moving the note bar toward an operation reference mark such that the note bar matches with an operation reference mark at an operation timing (for example, see Patent Literature 1).
Patent Literature 1: Japanese Patent Application Laid-Open No. 2001-96061.

SUMMARY OF INVENTION

Technical Problem

In the game machine disclosed in Patent Literature 1, the operation reference mark is fixed. Further, a moving direction of an operation indication mark moving toward an operation reference mark with the lapse of time is also fixed. For this reason, a player can easily infer a displacement direction and a displacement speed between the operation indication mark and the operation reference mark associated with the lapse of time.

In this regard, the present invention is directed to provide a game system, a control method of controlling a computer and a storage medium storing a computer program used thereof, which are capable of changing the displacement direction or the displacement speed between the operation indication mark and the operation reference mark associated with the lapse of time.

Solution to Problem

A game system of the present invention comprises: a display device that displays and outputs a game screen; an input device that includes at least one operating unit; a sequence data storage device that stores sequence data in which operation timing on the operating unit during a game is described; an operation timing determining device that determines the operation timing of the operating unit included in a predetermined time range from a current time to the future in the game based on the sequence data; an indication mark display device that causes an operation indication mark corresponding to each operation timing determined by the operation timing determining device to be displayed on the game screen; and a reference mark control device that causes an operation reference mark corresponding to a current time to be displayed on the game screen while causing the corresponding operation reference mark to move on the game screen such that the corresponding operation reference mark sequentially passes through operation indication marks at operation timings described in the sequence data, wherein the reference mark control device changes at least one of a moving direction and a moving speed of the operation reference mark according to a predetermined condition.

According to the present invention, at least one of the moving direction and the moving speed of the operation reference mark can be changed according to the predetermined condition. Thus, the displacement direction or the displacement speed between the operation indication mark and the operation reference mark associated with the lapse of time can be changed according to the predetermined condition. Further, since the moving direction of the operation reference mark or the like changes, it is difficult to predict the operation indication mark through which the operation reference mark passes next. For this reason, it is possible to provide the element of surprise to development of the game, and thus amusement of a game can be improved.

In an aspect of the game system of the present invention, the reference mark control device may change at least one of the moving direction and the moving speed of the operation reference mark at interval of predetermined time period using the predetermined time period as the predetermined condition. In this case, since at least one of the moving direction and the moving speed of the operation reference mark can be changed according to the lapse of time, the development of the game can be changed at interval of the predetermined time period.

At least one of the moving direction and the moving speed of the operation reference mark may change in an arbitrary manner. For example, in an aspect of the game system of the present invention, the indication mark display device may cause the operation indication marks to be displayed in a line in time order along a plurality of paths, and the reference mark control device may change the at least one of the moving direction and the moving speed of the operation reference mark by displaying the operation reference mark while moving the operation reference mark along one of the plurality of paths and changing a moving path of the operation reference mark to another path among the plurality of paths according to the predetermined condition.

Further, any devices may be used as the input device. For example, in an aspect of the game system of the present invention, a touch panel arranged on the display device so as to cover the game screen may be used as the input device.

In an aspect of the game system of the present invention, the game system may further comprise an evaluating device that evaluates an operation in at least one operating unit based on timing of an operation on the operating unit and the operation timing designated in the sequence data. In this case, the timing of an operation on the operating unit can be evaluated based on the operation timing described in the sequence data. Thus, amusement of the game can be further improved.

In an aspect of the game system of the present invention, the game system may further comprise: an audio output device that reproduces and outputs a game sound; a music data storage device that stores music data for reproducing a music; and a music reproducing device that causes the audio output device to reproduce the music based on the music data, and wherein the operation timing of the operating unit during reproduction of the music is described in the sequence data. In this case, it is possible to achieve a music game in which an operation reference mark moves to pass through an operation indication mark at an operation timing corresponding to a rhythm of music, and at least one of the moving direction and the moving speed of the operation reference mark can be changed according to a predetermined condition.

A control method of controlling a computer of the present invention is a control method of controlling a computer which is incorporated in a game system comprising: a display device that displays and outputs a game screen; an input device that includes at least one operating unit; a sequence data storage device that stores sequence data in which operation timing on the operating unit during a game is described, wherein the control method of controlling the computer comprises the steps: an operation timing determining step that determines the operation timing of the operating unit included in a predetermined time range from a current time to the future in the game based on the sequence data; an indication mark display step that causes an operation indication mark corresponding to each operation timing determined in the operation timing determining step to be displayed on the game screen; a reference mark control step that causes an operation reference mark corresponding to a current time to be displayed on the game screen while causing the corresponding operation reference mark to move on the game screen such that the corresponding operation reference mark sequentially passes through operation indication marks at operation timings described in the sequence data; and a step that changes at least one of a moving direction and a moving speed of the operation reference mark according to a predetermined condition in the reference mark control step.

Advantageous Effects of Invention

Further, a storage medium storing a computer program for a game system of the present invention is a storage medium storing a computer program for a game system comprising: a display device that displays and outputs a game screen; an input device that includes at least one operating unit; a sequence data storage device that stores sequence data in which operation timing on the operating unit during a game is described, wherein the computer program is configured to cause a computer which is incorporated in the game system to serve as: an operation timing determining device that determines the operation timing of the operating unit included in a predetermined time range from a current time to the future in the game based on the sequence data; an indication mark display device that causes an operation indication mark corresponding to each operation timing determined by the operation timing determining device to be displayed on the game screen; and a reference mark control device that causes an operation reference mark corresponding to a current time to be displayed on the game screen while causing the corresponding operation reference mark to move on the game screen such that the corresponding operation reference mark sequentially passes through operation indication marks at operation timings described in the sequence data, and the computer program is configured to further cause the reference mark control device to serve as a device that changes at least one of a moving direction and a moving speed of the operation reference mark according to a predetermined condition. It is possible to actualize the game system of the present invention by executing the control method of controlling a computer or the computer program for a game system of the present invention.

As described above, according to the present invention, it is possible to change the displacement direction or the displacement speed between the operation indication mark and the operation reference mark associated with the lapse of time.

DESCRIPTION OF EMBODIMENTS

Figure 1:
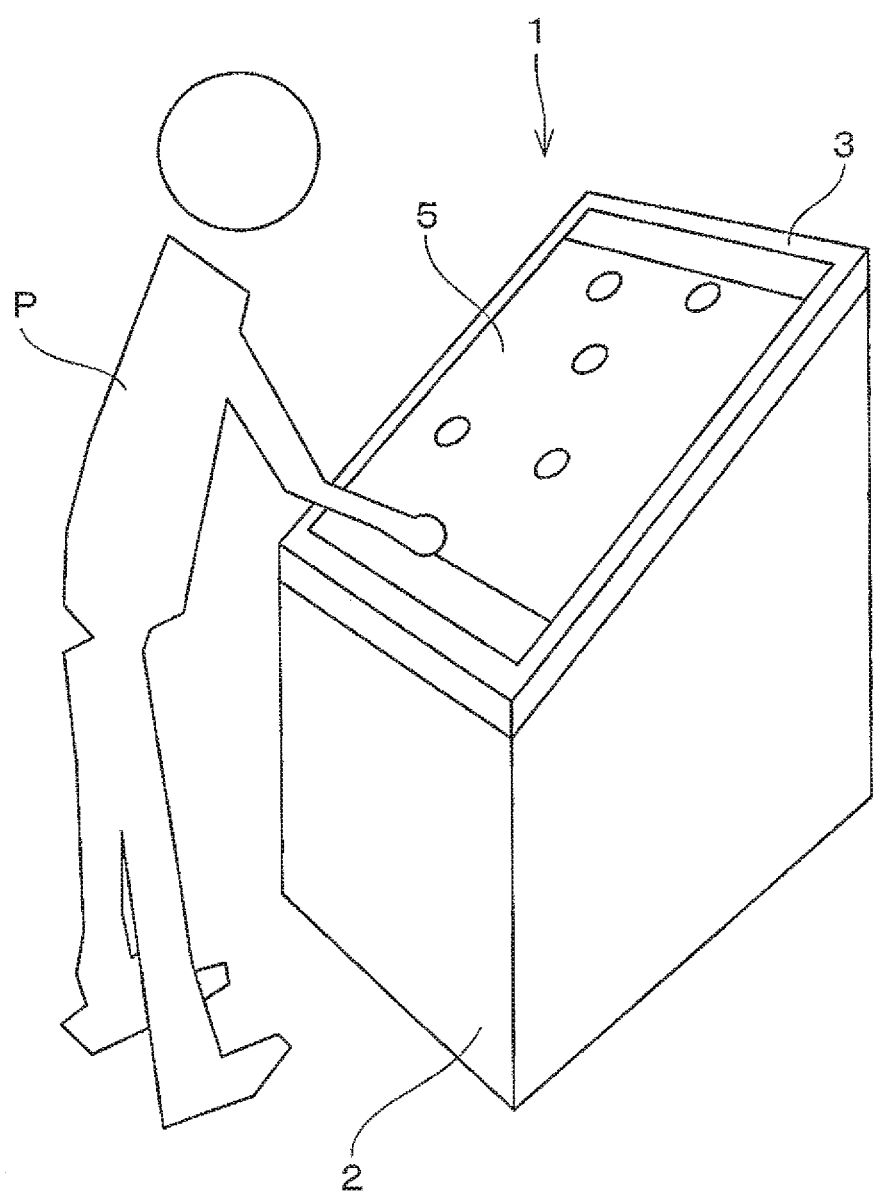
FIG. 1 is a diagram illustrating an example of a game machine to which a game system according to an embodiment of the present invention is applied.

Hereinafter, an embodiment of a game system according to the present invention will be described. FIG. 1 is a diagram illustrating a game machine for business use to which a game system according to an embodiment of the present invention is applied. As illustrated in FIG. 1, a game machine 1 includes a casing 2, and a monitor 3 serving as a display device arranged, obliquely toward a player P side, on the top surface of the casing 2. A transparent touch panel 5 serving as an input device is superimposed on the surface of the monitor 3. The touch panel 5 is a known input device that outputs a signal corresponding to a contact position when the player P contacts the touch panel 5 with his/her finger or the like. In addition, the game machine 1 includes various kinds of input devices and output devices provided in a typical game machine for business use such as a button used to make a selection or a decision, a power switch, a volume operation switch, and a power lamp, which are not illustrated in FIG. 1.

Figure 2:
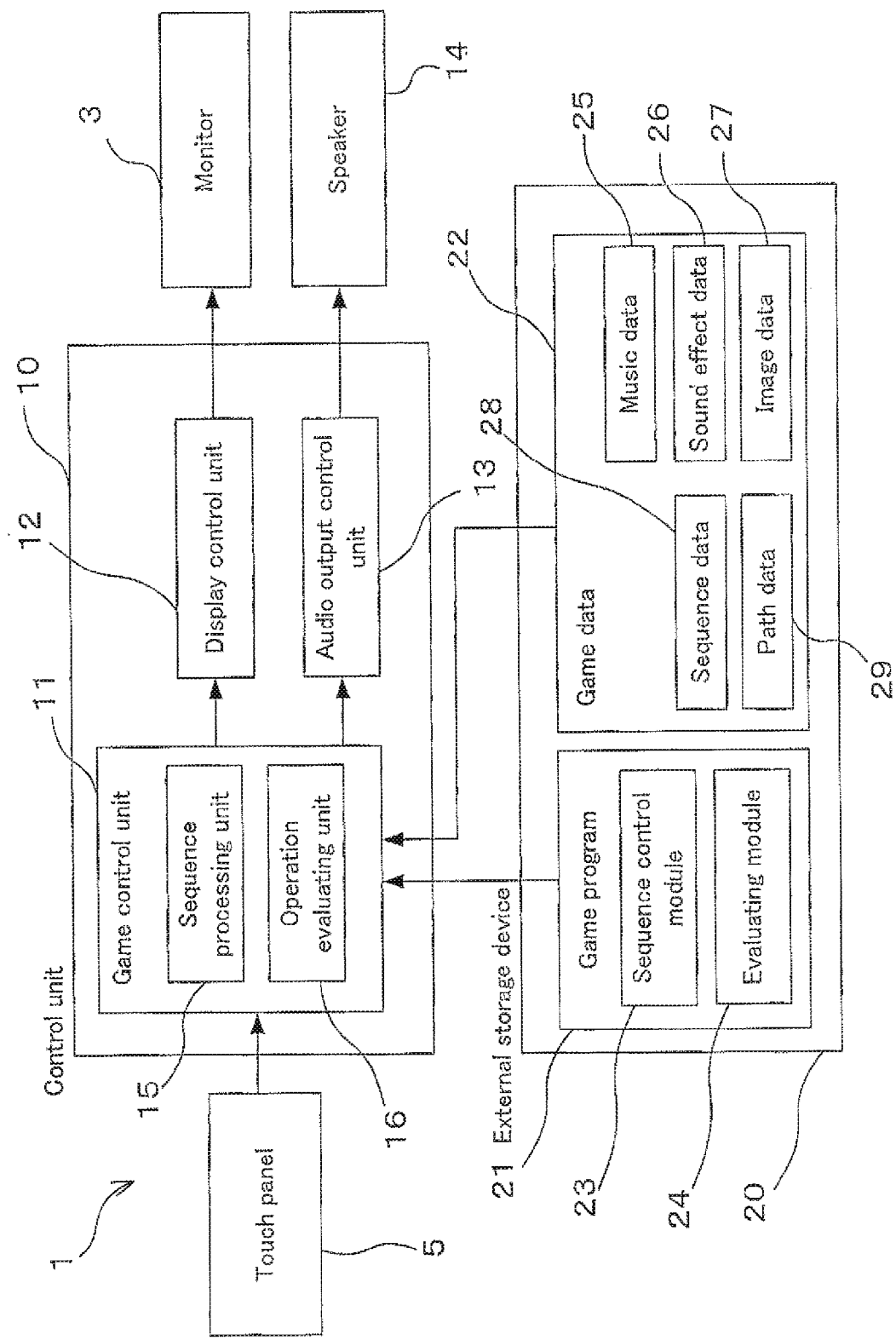
FIG. 2 is a functional block diagram of a game machine.

FIG. 2 is a functional block diagram of the game machine 1. As illustrated in FIG. 2, a control unit 10 serving as a computer is disposed in the casing 2. The control unit 10 includes a game control unit 11 serving as a control host, a display control unit 12 that operates according an output from the game control unit 11, and an audio output control unit 13. The game control unit 11 is configured as a unit in which a microprocessor is combined with various kinds of peripheral devices such as an internal storage device (for example, a read only memory (ROM) or a random access memory (RAM)) necessary for an operation of the microprocessor. The display control unit 12 causes a predetermined image to be displayed on the monitor 3 by rendering an image corresponding to image data provided from the game control unit 11 in a frame buffer and then outputting a video signal corresponding to the rendered image to the monitor 3. The audio output control unit 13 causes a predetermined sound (including music or the like) to be reproduced from a speaker 14 serving as an audio output device by generating an audio reproduction signal corresponding to audio reproduction data provided from the game control unit 11 and then outputting the generated audio reproduction signal to the speaker 14 connected to the control unit 10.

An external storage device 20 is connected to the game control unit 11. As the external storage device 20, there is used a storage medium in which data remains stored even when power is not supplied such as an optical storage medium including a digital versatile disc-read only memory (DVD-ROM) and a compact disc-read only memory (CD-ROM), a non-volatile semiconductor memory device including an electrically erasable programmable read-only memory (EE-PROM).

A game program 21 and game data 22 are stored in the external storage device 20. The game program 21 is a computer program necessary for the game machine 1 to execute a music game according to a predetermined procedure, and includes a sequence control module 23 and an evaluating module 24 in order to achieve a function according to the present invention. When the game machine 1 is activated, the game control unit 11 executes various kinds of initial settings necessary to operate as the game machine 1 by executing an operation program stored in an internal storage device thereof, and then sets an environment in which a music game is executed according to the game program 21 by reading the game program 21 from the external storage device 20 and then executing the game program 21. Here, when the sequence control module 23 of the game program 21 is executed by the game control unit 11, a sequence processing unit 15 is generated in the game control unit 11. Further, when the evaluating module 24 of the game program 21 is executed by the game control unit 11, an operation evaluating unit 16 is generated by the game control unit 11. The sequence processing unit 15 and the operation evaluating unit 16 are logical devices actualized by a combination of computer hardware and a computer program. The sequence processing unit 15 executes a music game process which includes instructing the player to make an operation in tune with reproduction of music selected by the player, generating a sound effect in response to the player's operation, or the like. The operation evaluating unit 16 executes a process which includes evaluating the player's operation and then controlling a game based on an evaluation result, or the like. In addition, the game program 21 includes various kinds of program modules necessary to execute a music game in addition to the modules 23 and 24, and logical devices corresponding to the modules are generated in the game control unit 11 although not illustrated.

The game data 22 includes various pieces of data to be referred to when a music game is executed according to the game program 21. For example, the game data 22 includes music data 25, sound effect data 26, and image data 27. The music data 25 is data necessary to cause music which is a target of a game to be reproduced and output from the speaker 14. FIG. 2 illustrates a single kind of music data 25, but the player can actually select a piece of music to be played from among a plurality of pieces of music. In the game data 22, one or more pieces of music data 25 are recorded in association with information identifying each piece of music. The sound effect data 26 is data in which each of one or more types of sound effects to be output from the speaker 14 in response to the player's operation is recorded in associated with a unique code for each sound effect. Sounds of musical instruments and various kinds of sounds are included as the sound effect. Pieces of sound effect data which are equal in number to a predetermined octave number and have different musical pitches according to a sound type are prepared. The image data 27 is data used to cause a background image, various kinds of objects or icons, and the like in a game screen to be displayed on the monitor 3.

The game data 22 further includes sequence data 28 and path data 29. The sequence data 28 is data used to define an operation timing to be indicated to the player. At least one piece of sequence data 28 is prepared for a single music data. The path data 29 is data used to define a variation in a moving path of an operation reference mark which will be described later or the like. The details of the data 28 and 29 will be described later.

Figure 3:
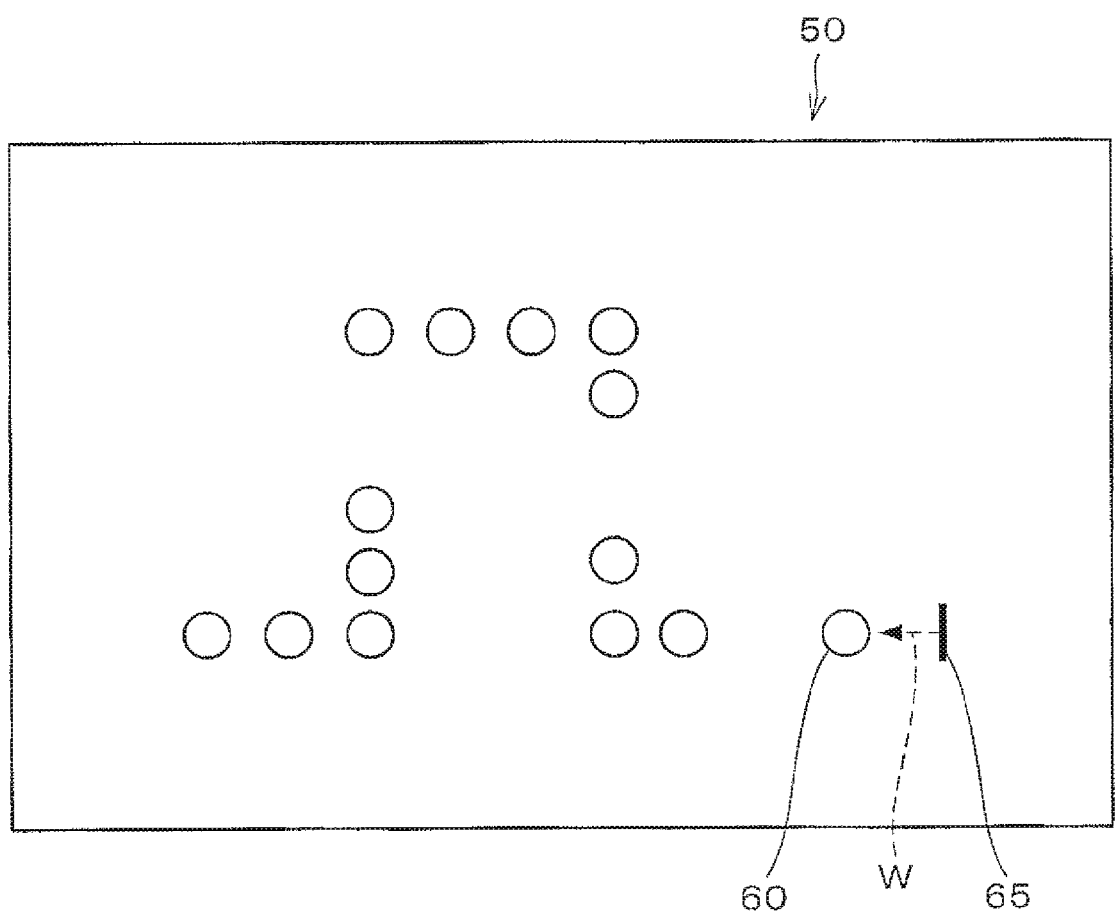
FIG. 3 is a diagram schematically illustrating a game screen.

Next, an outline of a music game executed by the game machine 1 will be described. The game machine 1 is configured as a music game machine of a type that evaluates an operation timing thereof or the like when the player executes an operation in tune with music. FIG. 3 is a diagram schematically illustrating a game screen. A plurality of objects 60 each serving as an operation indication mark corresponding to each operation timing described in the sequence data 28 are displayed on the game screen 50 while a music game is being executed, that is, when music is being reproduced. Further, a determination line 65 serving as an operation reference mark is displayed at an appropriate position on the game screen 50 while music is being reproduced. Further, a dashed arrow in FIG. 3 represents a path W along which the determination line 65 moves. The determination line 65 moves along the path W at a predetermined speed so as to match with an object 60 corresponding to operation timing at operation timing according to the progress of music.

Figure 4:
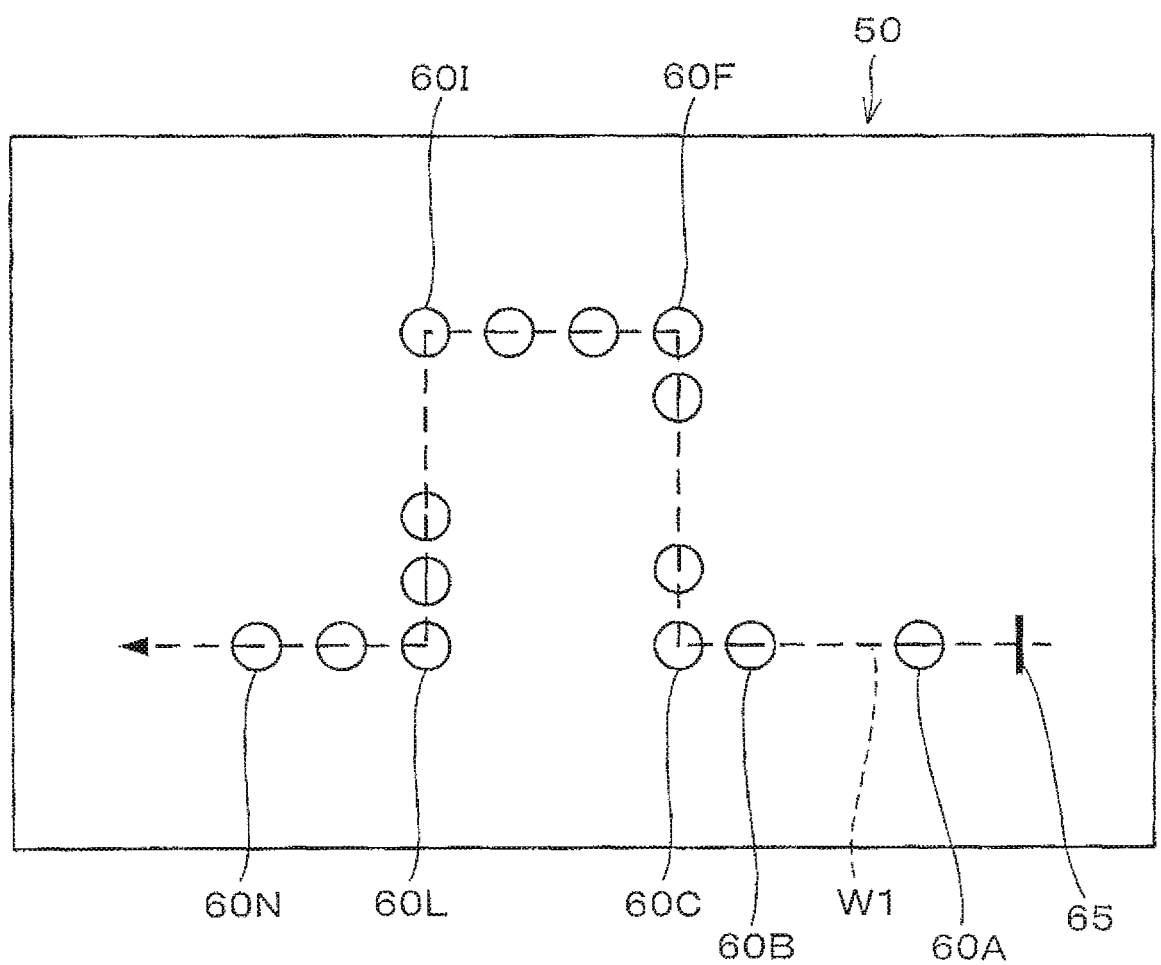
FIG. 4 is a diagram illustrating an example of a path along which a determination line moves.

There are a plurality of moving paths W along which the determination line 65 moves. FIG. 4 is a diagram illustrating an example of a path along which the determination line 65 moves. A dashed line in FIG. 4 represents the path W1. As illustrated in FIG. 4, the path W1 extends from the right side to the left side of the game screen 50, draws a reverse U-shaped trajectory so as to make a detour in a part thereof, and then extends to the left side again on an extension of the original trajectory. Then, the objects 60 are arranged in a line, on the path W1 along which the determination line 65 moves, in time order along the path W1. Specifically, a rightmost object 60A is arranged near a starting point of the path W1, a first corner object 60C is arranged at a first corner of the detour, a second corner object 60F is arranged at a second corner of the detour, a third corner object 60I is arranged at a third corner of the detour, a fourth corner object 60L is arranged at a last corner at which an extension from the detour toward the left side starts again, and a leftmost object 60N is arranged near an ending point of the path W1. Further, between one object 60 and a next object 60 on the same path, there is provided an interval corresponding to a time interval between an operation timing corresponding to the one object 60 and an operation timing corresponding to the next object 60. In the example of FIG. 4, between the rightmost object 60A and the next object 60B positioned next to the rightmost object 60A on the path W1, there is provided a distance corresponding to a time interval between an operation timing corresponding to the rightmost object 60 and an operation timing corresponding to the next object 60B.

The determination line 65 moves along the path W1 from the right side to the left side to match with each object 60 at an operation timing corresponding to each object 60 according to the progress of music. The player is required to perform a touch operation of touching the determination line 65 in tune with an arrival of the determination line 65 at each object 60. When the player performs the touch operation, a time difference between a time at which the determination line 65 arrives at the object 60 and a time at which the player performs the touch operation is detected. The smaller the time difference is, the higher the player's operation is evaluated. In the example of FIG. 4, the determination line 65 is positioned directly before arriving at the object 60A positioned at the right end of the path W1. It is preferable that the player perform the touch operation on the determination line 65 in tune with an arrival of the determination line 65 at the object 60A. In the present embodiment, an operating unit is configured by a combination of the determination line 65 displayed on the monitor 3 and the touch panel 5 to be superimposed on the determination line 65. In addition, in the following, the determination line 65 may be used as a term representing the operating unit.

Figure 5:
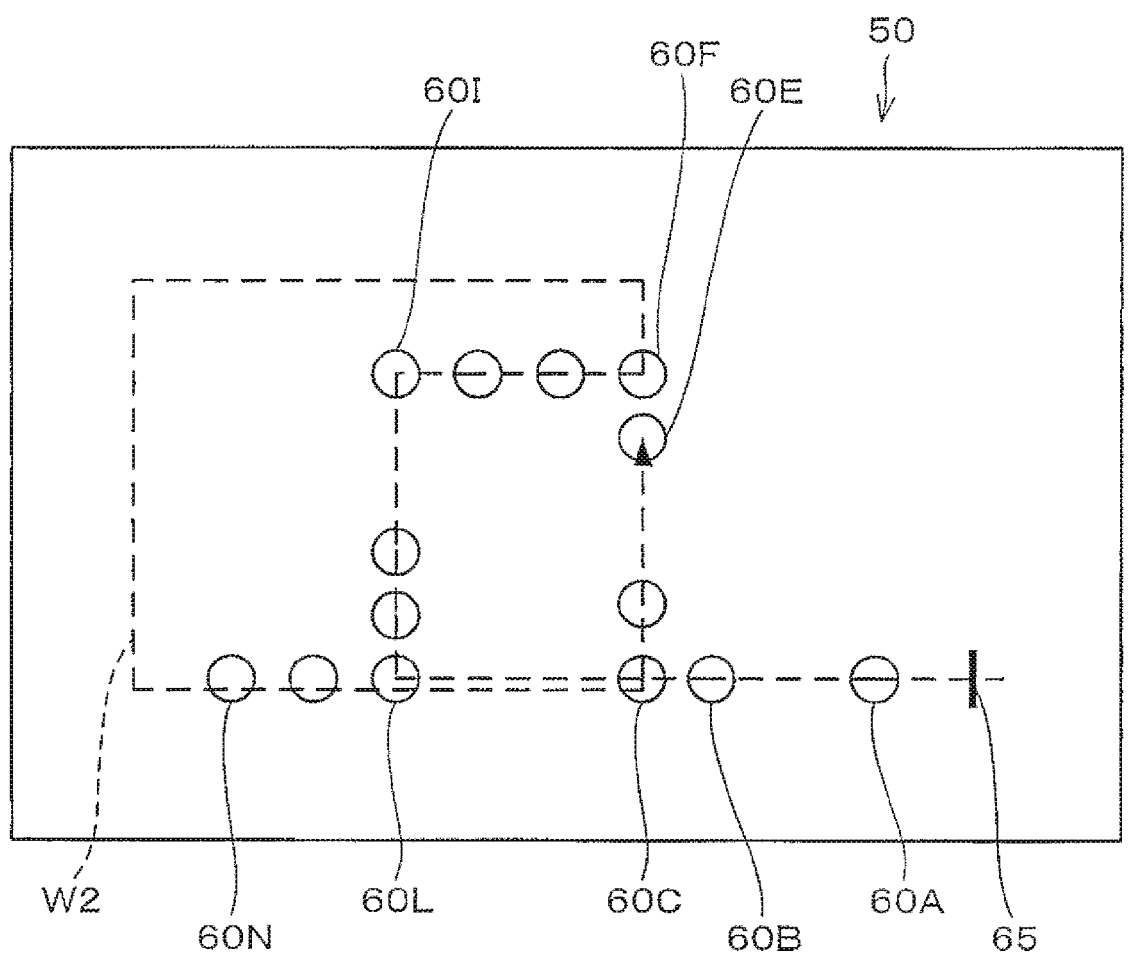
FIG. 5 is a diagram illustrating another path example along which a determination line moves.

Further, FIG. 5 is a diagram illustrating another path example along which the determination line 65 moves. A dashed line in FIG. 5 represents another path W2 along which the determination line 65 moves. As illustrated in FIG. 5, the positions at which objects 60 are arranged on a game screen 50 of FIG. 5 are the same as the positions at which the objects 60 are arranged on the game screen of FIG. 4. Meanwhile, the other path W2 along which the determination line 65 moves is different from the moving path W1 of FIG. 4. In the example of FIG. 5, the other path W2 extends from a rightmost object 60 to a fourth corner object 60L from the right side toward the left side. Then, the other path W2 changes its direction to the upper side at the fourth corner object 60L, returns to right side from a third corner object 60I until a position of a second corner object 60F, then changes its position to the upper side, and extends leftward again up to a leftmost object 60N. Furthermore, the other path W2 extends rightward from the leftmost object 60 to a first corner object 60, changes its direction to the upper side, and extends up to an object 60E near the second corner object 60F. The determination line 65 moves along the other path W2 to match with each object 60 on the path W2 at an operation timing corresponding to each object 60. Further, in the example of FIG. 5, each of the first corner object 60C and the fourth corner object 60L serves as an object 60 representing two operation timings.

As illustrated in FIGS. 3 to 5, the objects 60 representing the operation timing are arranged on the moving path of the determination line 65 in time order. Further, even when the objects 60 are arranged in the same form, a plurality of paths W may exist as the moving path of the determination line 65, and the objects 60 may be arranged on a plurality of paths. Furthermore, the object 60 displayed as the same object 60 on the game screen 50 may indicate two operation timings. In the same music, the objects 60 displayed on the game screen 50 at the same time are the objects 60 whose operating timings are included in a predetermined time range. And, a plurality of paths W are provided as the moving path of the determination line 65 for each predetermined time range serving as a predetermined time period, and the moving path of the determination line 65 changes at intervals of predetermined time periods. Furthermore, even within each predetermined time period, that is, even when an arrangement of the objects 60 is the same, the moving path of the determination line 65 is not necessarily the same. For this reason, it is difficult for the player to predict the moving direction of the determination line 65 based on only the arrangement of the objects 60 displayed on the game screen 50. Thus, the player is requested to execute an operation in tune with a rhythm of music while responding to an unexpected movement of the determination line 65. In addition, in FIGS. 3 to 5, for convenience of description, the moving paths W, W1, and W2 of the determination line 65 are indicated by dashed lines, but the moving paths W, W1, and W2 are not actually displayed on the game screen 50. Further, each of the paths W1 and W2 serves as each of a plurality of paths according to the present invention.

Figure 6:
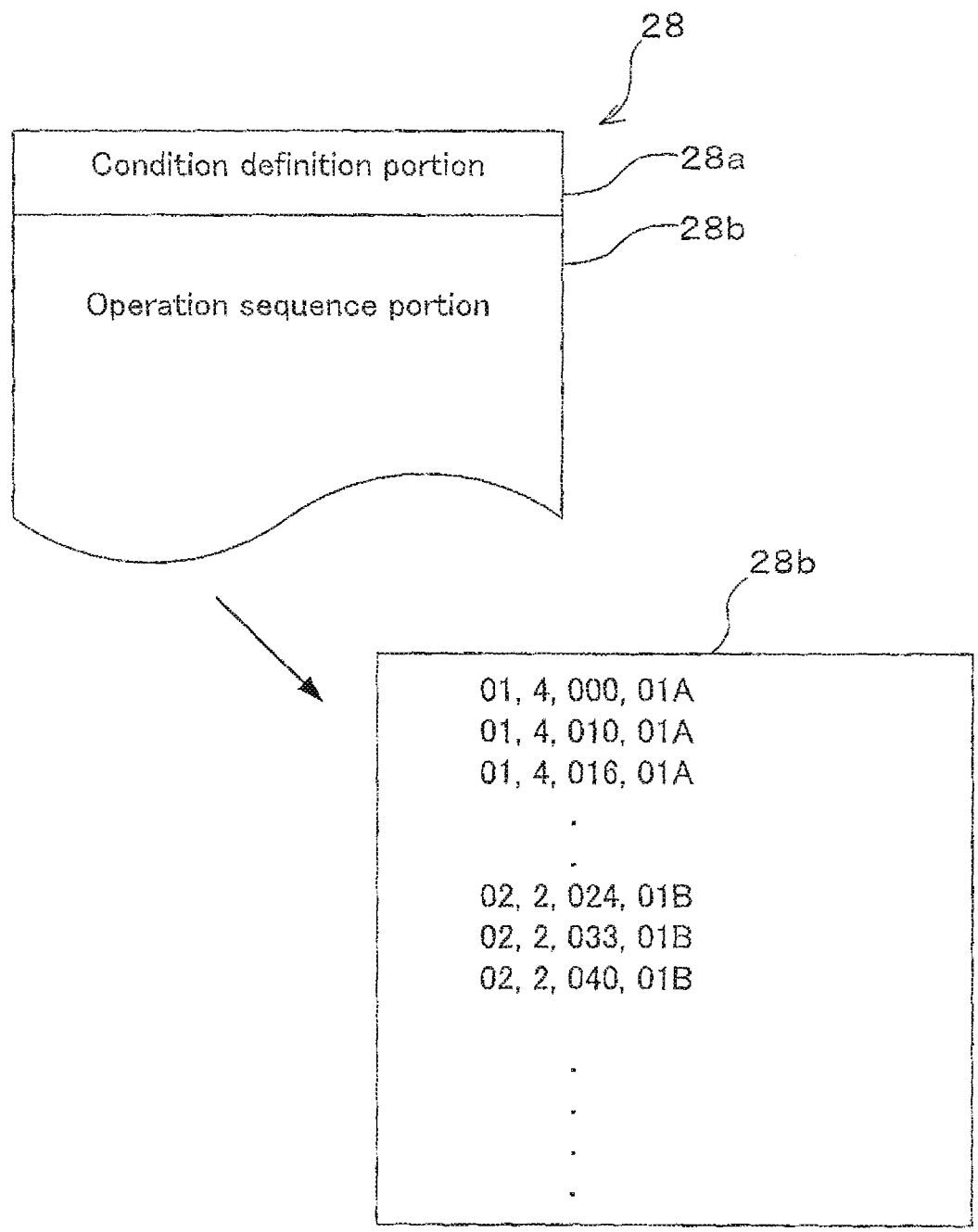
FIG. 6 is a diagram illustrating an example of content of sequence data.

Next, the details of the sequence data 28 and the path data 29 will be described with reference to FIGS. 6 and 7. The sequence data 28 includes a condition definition portion 28a and an operation sequence portion 28b as illustrated in FIG. 6. In the condition definition portion 28a, there is described information designating an execution condition of a game that differs according to music, such as information designating the tempo, a beat, a track of music, a sound effect to be generated when the touch operation is performed on the object 60, or the like. In addition, in FIG. 6, the condition definition portion 28a is provided in the head portion of the sequence data 28, but the condition definition portion 28a may be added to an appropriate intermediate position of the operation sequence portion 28b. Thus, processes such as a change the tempo of music, a change of an assignment of a sound effect, or the like can be achieved.

Meanwhile, in the operation sequence portion 28b, a timing to perform the touch operation on the object 60 is described in association with information identifying each predetermined time period of the object 60 on the game screen. FIG. 6 is a diagram illustrating an example of content of the sequence data. As partially illustrated in FIG. 6, the operation sequence portion 28b is configured as a set of a plurality of records in which a timing (operation timing) to perform an operation in music is associated with information identifying a predetermined time period. The operation timing is described such that a bar number in music, beats, and a value representing a time in a beat are separated by a comma. A time in a beat represents an elapsed time from the head of one beat, and is represented by the number of units, from the head of the beat, obtained by equally dividing the time length of one beat into n unit times. For example, when n=100, and ¼ has elapsed from the head of a second beat in a second beat of a first bar of a music is designated as an operation timing or a display start timing, "01,2,025" is described.

The information identifying a predetermined time period is defined for each piece of music and for each segment from the start of the progress of the music based on a beat or the like, that is, each time a predetermined time elapses in the music. Specifically, the information identifying a predetermined time period is configured with, for example, a number "01" or the like representing a piece of music and an alphabet "A" or the like identifying a number of a corresponding segment in the music like "01A," "01B," or "02A," "02B." In other words, "01A" is described for an operation timing corresponding to a first segment of a piece of music corresponding to the music number 01.

In the example of FIG. 6, an operation timing and an operating unit are designated such that at each of timings of a starting point in time (000) of a fourth beat of a first bar, a timing in which "010" has elapsed from the starting point in time of the fourth beat of the first bar, and a timing in which "016" has elapsed from the starting point in time of the fourth beat of the first bar, the objects 60 corresponding to the respective operation timings match with the determination line 65, and the touch operation of touching the position at which the determination line 65 is arranged in tune with the matching is performed. Furthermore, the object 60 corresponding to the starting point in time (000) of the fourth beat of the first bar is instructed so as to be displayed in a first segment of the music number 01. Further, it is instructed that at each of timings of a timing in which "024" has elapsed from a starting point in time of a fourth beat of a second bar, a timing in which "033" has elapsed, and a timing in which "040" has elapsed, the objects 60 corresponding to the respective operation timings match with the determination line 65, and the objects 60 is displayed in a second segment of the music number 01.

The path data 29 is data in which a plurality of paths along which the determination line 65 moves are described in association with information identifying a predetermined time period. FIG. 7 is a diagram illustrating an example of content of the path data 29. As illustrated in FIG. 7, the path data 29 is configured as a set of a plurality of records in which information identifying a predetermined time period is associated with information indicating each of a plurality of paths W prepared for each predetermined time period. Further, the information identifying a predetermined time period and information indicating each of a plurality of paths W are separated by a comma. And, the information identifying a predetermined time period is configured with, for example, a number "01" representing music and an alphabet "A" identifying a number of a corresponding segment in the music, similarly to the sequence data 28. Further, an alphabet "A" or the like is separated by a comma and described as information identifying a plurality of paths W. The alphabet "A" or the like is associated with each of a plurality of paths W of the determination line 65 which is previously set.

Figure 7:
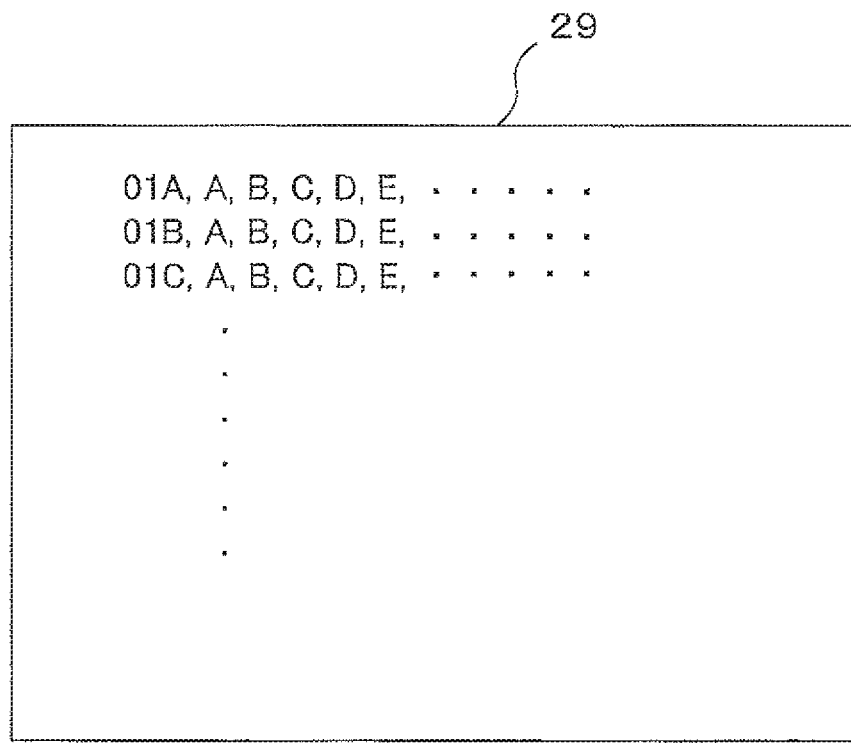
FIG. 7 is a diagram illustrating an example of content of path data.

In the example of FIG. 7, at least five paths from "A" to "E" are set as a path for moving the determination line 65 to a first segment of the music number 01 identified by the information "01A" identifying a predetermined time period. Further, for example, a path corresponding to "A" of the information "01A" identifying a predetermined time period corresponds to the path W1 illustrated in FIG. 4, and a path corresponding to "B" corresponds to the path W2 illustrated in FIG. 5.

The sequence processing unit 15 of the game control unit 11 controls a display of the determination line 65 such that the determination line 65 matches with the object 60 at an operation timing designated by the sequence data 28. Further, the sequence processing unit 15 decides a path along which the determination line 65 moves from among a plurality of paths W defined in the path data 29. A concrete process executed by the sequence processing unit 15 will be described later.

Next, a process of the game control unit 11 when the game machine 1 executes a music game will be described. The game control unit 11 reads the game program 21 and performs initial setting necessary to execute a music game, and then is on standby for a game start instruction from the player. For example, the game start instruction includes an operation specifying data used in a game such as selection of music to be played in a game or a difficulty level. A procedure receiving the instruction may be the same as in a known music game.

When a game start is instructed, the game control unit 11 causes reproduction of the music to be started through the speaker 14 by reading the music data 25 corresponding to the music selected by the player and outputting the read music data 25 to the audio output control unit 13. Through this operation, the control unit 10 functions as a music reproducing device. Further, the game control unit 11 causes the game screen 50 to be displayed on the monitor 3 by reading the sequence data 28 corresponding to the player's selection in synchronization with reproduction of the music, generating image data necessary for the game screen 50 with reference to the image data 27, and outputting the generated image data to the display control unit 12. Furthermore, as processes necessary to display the game screen 50 or the like during execution of the music game, the game control unit 11 repeatedly executes a path decision process routine illustrated in FIG. 8, a sequence process routine illustrated in FIG. 9, and an operation evaluation routine illustrated in FIG. 10 in a predetermined cycle. In addition, the sequence processing unit 15 handles the routines of FIGS. 8 and 9, and the operation evaluating unit 16 handles the operation evaluation routine of FIG. 10.

Figure 8:
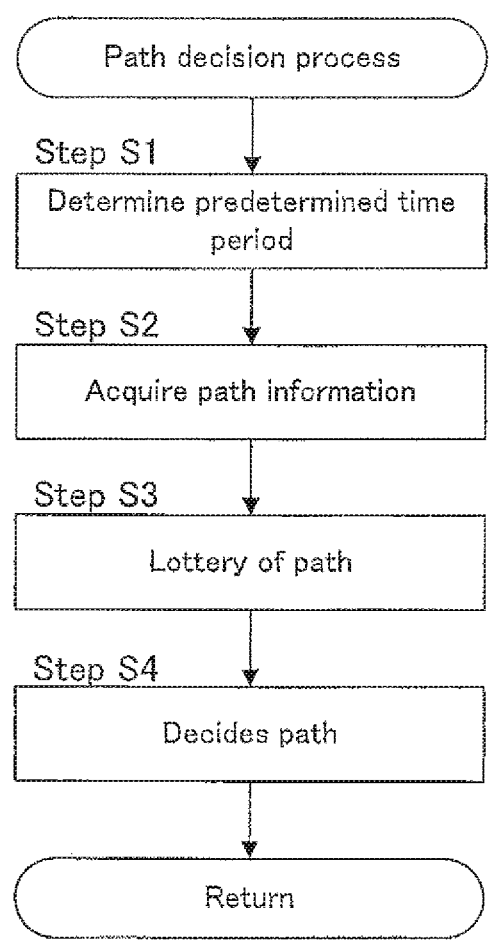
FIG. 8 is a diagram illustrating an example of a flowchart of a path decision process routine.

FIG. 8 illustrates an example of a flowchart of a path decision process routine executed by the sequence processing unit 15. When the routine of FIG. 8 starts, in step S1, the sequence processing unit 15 of the game control unit 11 determines a predetermined time period to which a game screen to be displayed from now belongs. For example, this determination may be made by comparing a current time with a predetermined time period. Alternatively, this determination may be made by comparing a current time with information of a predetermined time period corresponding to an operation timing described in the sequence data 28.

In step S2, the sequence processing unit 15 acquires the path information corresponding to the predetermined time period from the path data 29 based on the predetermined time period determined in step S1. For example, when it is determined in step S1 that the predetermined time period is "01A," "A" to "E" or the like are acquired from the path data 29 as a plurality of paths W corresponding to "01A."

Subsequently, in step S3, the sequence processing unit 15 executes a lottery of a path to be set at this time as a path of the determination line 65 among pieces of path information corresponding to a plurality of paths W acquired in step S2. For example, the lottery may be achieved as a random lottery using a random number. Then, in next step S4, the sequence processing unit 15 decides a path selected in the lottery of step S3 as a current path of the determination line 65, and then ends the current routine. The routine is repeatedly executed at intervals of predetermined time periods before a next predetermined time period comes.

Figure 9:
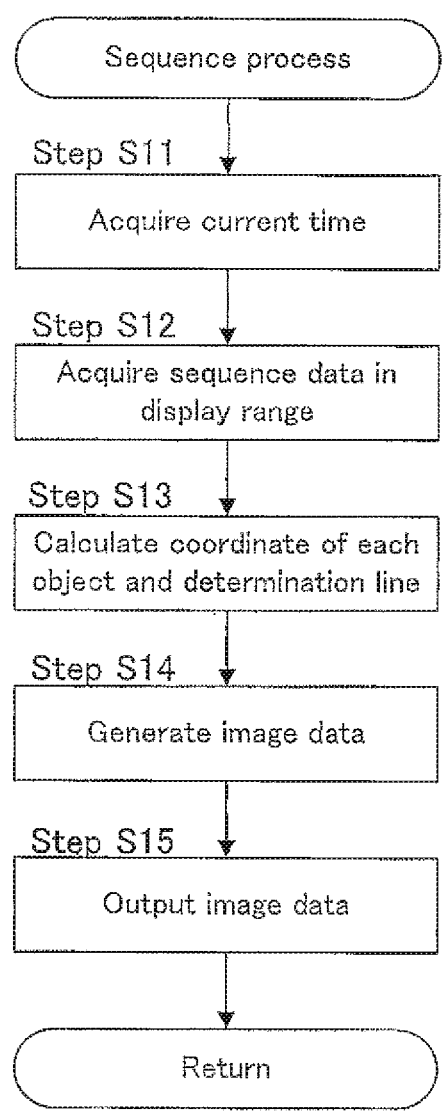
FIG. 9 is a diagram illustrating an example of a flowchart of a sequence process routine.

Further, FIG. 9 illustrates an example of a flowchart of the sequence process routine executed by the sequence processing unit 15. When the routine of FIG. 9 starts, in step S11, the sequence processing unit 15 of the game control unit 11 first acquires a current time in the music. For example, clocking starts, by an internal clock of the game control unit 11, from a reproduction start point in time of the music, and the current time is acquired based on a value of the internal clock. Subsequently, in step S12, the sequence processing unit 15 acquires data of operation timing present in a time length corresponding to a display range of the game screen 50 from the sequence data 28. For example, the display range is set to a time range of about two bars of the music from the current time to the future.

In step S13, the sequence processing unit 15 calculates coordinates of each object 60 and the determination line 65 on the game screen 50. For example, this calculation is performed as follows. First, arrangement coordinate of each object 60 is acquired. For example, this arrangement coordinates of the objects 60 are decided based on the result of the routine of FIG. 8. Since the path decided by the routine of FIG. 8 corresponds to the music and an elapsed time of the music, the position (operation timing) of the objects 60 arranged in time order along the path from the starting position of the path can be decided accordingly. For this reason, it is possible to set the arrangement position of each object 60 in advance for every plurality of paths W prepared corresponding to each predetermined time period. In other words, it is possible to prepare information of the arrangement coordinates of the objects 60 in order of operation timings described in the sequence data 28 on each of a plurality of paths W, that is, information of the arrangement coordinates of all the objects 60 corresponding to each of all paths in advance. And, when the arrangement coordinate of each object 60 is prepared for each path in advance, it is possible to acquire the arrangement coordinate of the object 60 corresponding to each operating timing included in a predetermined time period, that is, a predetermined time range together with the path of the determination line 65 based on the routine result of FIG. 8. Next, the position of the determination line 65 on the path in the time axis direction (that is, the moving direction of the determination line 65) of the path is determined based on a time difference between each operation timing and the current time. Thus, it is possible to acquire the coordinates of each of the objects 60 arranged in time order along the path of the determination line 65 and the coordinates of the position of the determination line 65 along the time axis on the path.

In addition, the arrangement coordinate of each object 60 on the path may be acquired, for example, by a calculation. Specifically, in step S13, it is preferable that the sequence processing unit 15 calculate the arrangement coordinates that have a arrangement of time order in the moving direction from a movement starting position of the determination line 65, and an interval corresponding to the moving speed of the determination line 65 based on the sequence data 28, according to the path, along which the objects 60 are to be arranged, decided by the routine of FIG. 8.

Next, in step S14, the sequence processing unit 15 generates image data necessary to render the game screen 50 based on the coordinate of each object 60 and the coordinates of the determination line 65 which are calculated in step S13. Specifically, the sequence processing unit 15 generates the image data so that each object 60 and the determination line 65 are arranged at the calculated coordinates. Subsequently, in step S15, the sequence processing unit 15 outputs the image data to the display control unit 12. As a result, the game screen 50 is displayed on the monitor 3. When the process of step S14 ends, the sequence processing unit 15 ends the current sequence process routine. By repetition execution of the above-described process, the determination line 65 moves along the predetermined path W such that the determination line 65 arrives at the object 60 corresponding to the operation timing at the operation timing described in the sequence data 28.

Figure 10:
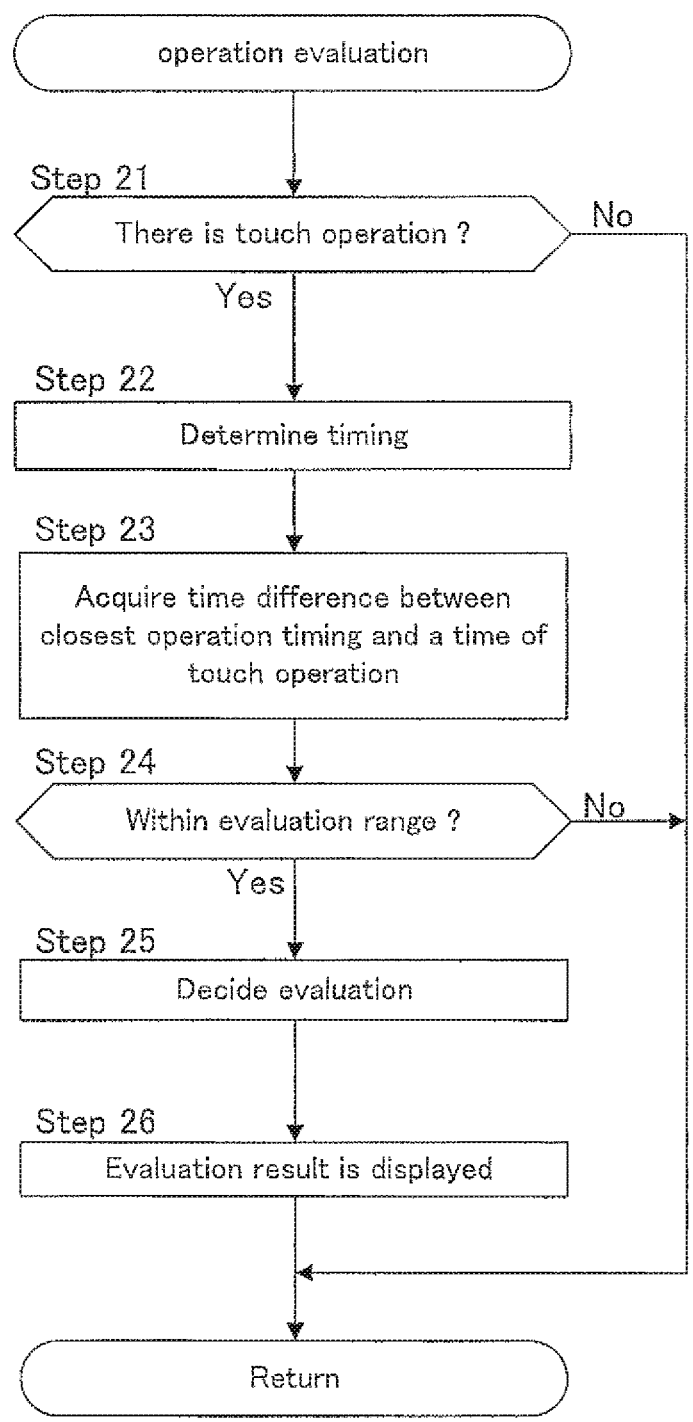
FIG. 10 is a diagram illustrating an example of a flowchart of an operation evaluation routine.

Next, the operation evaluation routine of FIG. 10 will be described. When the operation evaluation routine of FIG. 10 starts, in step S21, the operation evaluating unit 16 first determines the presence or absence of the touch operation on the determination line 65 with reference to an output signal of the touch panel 5. At this time, when the position other than the determination line 65 is touched, it is determined that there is no touch operation. When it is determined that there is no touch operation, the operation evaluating unit 16 ends the current routine. On the other hand, when it is determined that there is the touch operation, the operation evaluating unit 16 proceeds to step S22. In step S22, the operation evaluating unit 16 determines timing (a time in the music) at which the touch operation is performed based on the position signal output from the touch panel 5. Subsequently, in step S23, the operation evaluating unit 16 specifies a nearest operation timing described in the sequence data 28, that is, an operation timing which is closest in time in the sequence data 28, and acquires a time difference between the operation timing and a time at which the touch operation has been made.

Next, in step S24, the operation evaluating unit 16 determines whether or not the player's operation is appropriate by determining whether or not the time difference is within an evaluation range. A predetermined time range is set to before and after an operation timing of a comparison target as the evaluation range. For example, a plurality of steps of levels is set centering on operation timing, and a time range in which the levels are set is used as the evaluation range. When it is determined in step S24 that the time difference is outside the evaluation range, the operation evaluating unit 16 ends the current routine. On the other hand, when it is determined that the time difference is within the evaluation range, the operation evaluating unit 16 proceeds to step S25. Subsequently, in step S25, the operation evaluating unit 16 decides an evaluation on the player's touch operation based on the time difference acquired in step S24. For example, this evaluation is achieved by determining whether or not a timing of the touch operation belongs to any one of a plurality of levels set in the time range. A plurality of levels are set such that the time range is divided in units of predetermined time periods, and the touch operation that belongs to a division close to an operation timing of each division is highly evaluated. Thereafter, the operation evaluating unit 16 proceeds to step S26, and controls an output to the display control unit 12 such that the evaluation result is displayed on the game screen 50. When the process of step S26 is completed, the operation evaluating unit 16 ends the current routine.

As described above, according to the game machine 1 of this embodiment, the determination line 65 moves along any one of a plurality of paths W prepared for each predetermined time period. Further, the moving path W of the determination line 65 changes at intervals of predetermined time periods, that is, at intervals of predetermined time ranges. Thus, the moving path of the determination line 65 can be changed in various forms. Further, since the moving path of the determination line 65 changes in various forms, it is difficult to predict the moving path of the determination line 65 from the arrangement of the objects 60 displayed on the game screen 50. For this reason, it is possible to provide the element of surprise to development of the game, and thus amusement of a game can be improved.

In the above embodiment, the external storage device 20 of the game machine 1 serves as a music data storage device and a sequence data storage device. Further, the control unit 10 serves as an operation timing determining device, an indication mark display device, and a reference mark control device by causing the sequence processing unit 15 to execute the routines of FIGS. 8 and 9. Furthermore, the control unit 10 serves as an evaluating device by causing the operation evaluating unit 16 to execute the routine of FIG. 10.

The present invention is not limited to the above-described embodiment and can be embodied in appropriate embodiments. In the above embodiment, the display range of the game screen 50 is used as the predetermined time period, and a plurality of paths W are set for each display range of the game screen 50, that is, for each arrangement pattern of the objects 60 arranged on the game screen. However, the present invention is not limited to this embodiment. For example, the arrangement positions of the objects 60 between a plurality of paths W prepared in the same predetermined time period may not be the same. In other words, the arrangement positions of the objects 60 may be different between a plurality of paths W prepared in the same predetermined time period. Further, for example, a unit smaller than the display range of the game screen 50 may be used as the predetermined time period, and a plurality of paths W may be set within the display range of the game screen 50. In this case, the moving path of the determination line 65 can be changed even in a state in which the arrangement pattern of the objects 60 does not change.

Further, in the above-described embodiment, the moving speed of the determination line 65 is set to be constant. However, the moving speed of the determination line 65 may be freely changed according to a condition such as a game circumstance to improve a difficulty level of a game. For example, the moving speed of the determination line 65 may be reduced by decreasing the progress tempo of music in midstream, and a path in which the moving speed of the determination line 65 changes in midstream may be prepared in advance. Further, the moving path of the determination line 65 may include a path that allows the same trajectory as the already progressed path to be traced in a direction reverse to the current moving direction, that is, a path that allows backward movement along the same path. In this case, it is possible to provide a rendering effect by which the determination line 65 moves back, and thus the moving path of the determination line 65 can be changed in more various forms.

Figure 11:
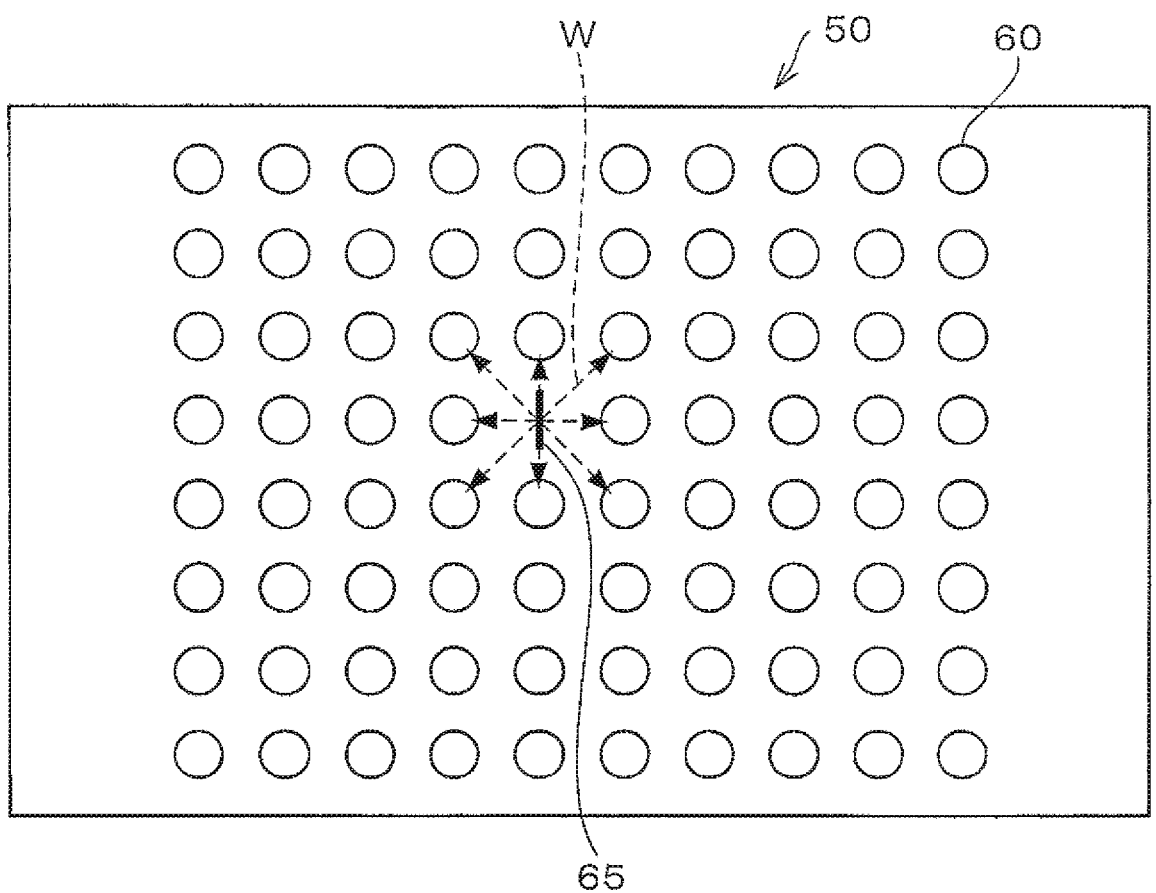
FIG. 11 is a diagram illustrating an exemplary arrangement of objects according to a modified embodiment.

Further, in the above embodiment, the objects 60 are arranged in time order along the path W of the determination line 65 apart from each other by a distance corresponding to a time interval therebetween. However, the present invention is not limited to this example. For example, any distance may be set as a distance between the objects 60. In this case, it is preferable that the moving speed of the determination line 65 be adjusted corresponding to a distance from the object 60 corresponding to the next operation timing. Further, the invention is not limited to the configuration in which the operation indication mark is arranged on the previously set path of the determination line 65. FIG. 11 is a diagram illustrating an exemplary arrangement of objects 60 according to a modified embodiment. In the example of FIG. 11, the objects 60 are arranged in advance in the form of a matrix. Further, the determination line 65 is arranged at the position near the center of the objects 60 arranged in the form of a matrix. And, for the determination line 65, directions including up and down direction, left and right directions, an oblique direction oblique to the right, and an oblique direction oblique to the left are prepared as moving path W candidates. In other words, in the example of FIG. 11, the arrangement position of each object 60 corresponding to the operation timing described in the sequence data 28 is decided in advance independently of the path of the determination line 65 and a time interval between operation timings. And, in this case, it is preferable that the moving speed or the moving direction of the determination line 65 or the like be adjusted corresponding to the arrangement position of each object 60 such that the determination line 65 sequentially passes through the objects 60 at the operation timings described in the sequence data 28. In this case, examples of the sequence process and the path decision process executed by the sequence processing unit 15 will be described with reference to FIGS. 12 and 13.

Figure 12:
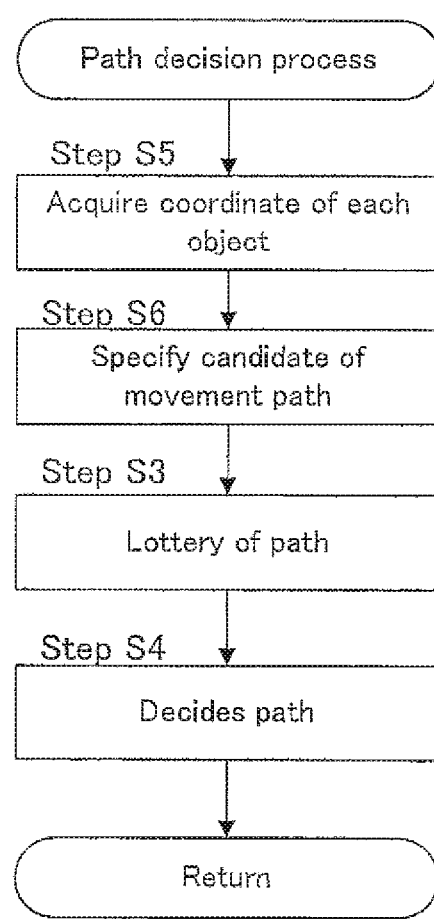
FIG. 12 is a diagram illustrating an example of a flowchart of a path decision process routine when an arrangement of objects is decided in advance independently of a path of a determination line and a time interval between operation timings.

FIG. 12 is a diagram illustrating an example of a flowchart of the path decision process routine executed by the sequence processing unit 15 when the arrangement of the objects 60 is decided in advance independently of the path of the determination line 65 and the like. When the path decision process routine of FIG. 8 is compared with the routine of FIG. 12, in the routine of FIG. 12, steps S5 and S6 are executed instead of steps S1 and S2 of the routine of FIG. 8. Specifically, when the routine of FIG. 12 starts, in step S5, the sequence processing unit 15 acquires information about the arrangement coordinate of each object 60 included in a predetermined time range. The arrangement coordinate of each object 60 is set in advance for each predetermined time range. For this reason, the arrangement coordinate of each object 60 can be acquired from the information about the arrangement coordinates of the objects 60 prepared in advance for each predetermined time range. Next, in step S6, the sequence processing unit 15 acquires current coordinate of the determination line 65, compares the acquired coordinate with the coordinate of each object 60, and specifies the objects 60 positioned in the respective directions (the up and down directions, the left and right directions, the oblique directions, and the like). Subsequently, in step S3, the sequence processing unit 15 executes a lottery of a path used for next movement among paths leading to the objects 60 positioned in the respective directions. The lottery may be executed in the same manner as in step S3 of the routine of FIG. 8. Further, next step S4 may be executed in the same manner as in the routine of FIG. 8. The routine of FIG. 12 is repeatedly executed each time the determination line 65 passes through each object 60 after movement of the determination line 65 starts. Through this operation, the moving path along which the determination line 65 moves toward the next object 60 is decided.

Figure 13:
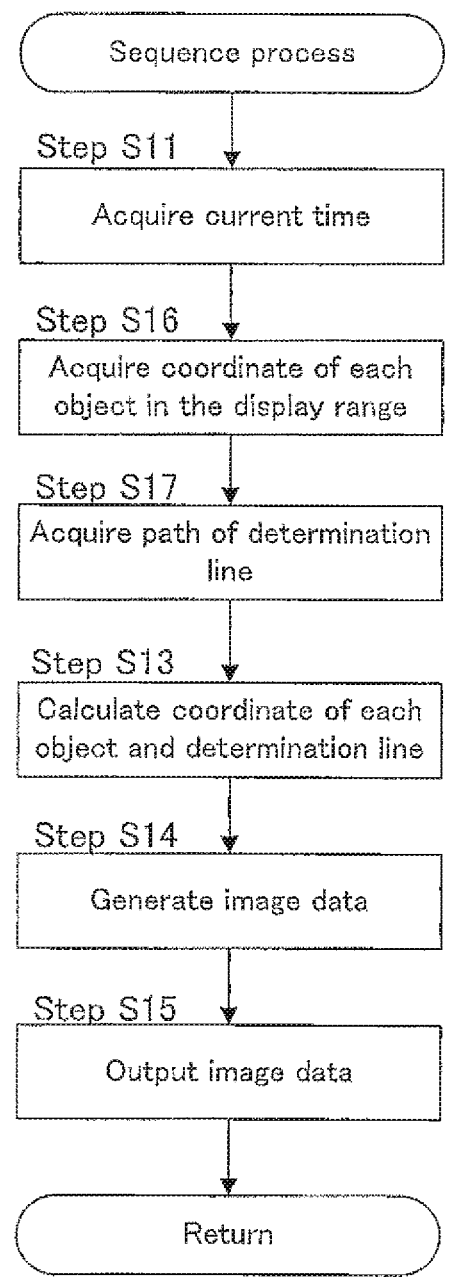
FIG. 13 is a diagram illustrating an example of a flowchart of a sequence process routine when the routine of FIG. 12 is executed.

Meanwhile, FIG. 13 is a diagram illustrating an example of a flowchart of the sequence process routine executed by the sequence processing unit 15 when the routine of FIG. 12 is executed. When the sequence process routine of FIG. 9 is compared with the routine of FIG. 13, in the routine of FIG. 13, steps S16 and S17 are executed instead of step S12 of the routine of FIG. 9. Specifically, in the routine of FIG. 12, in step S16, the sequence processing unit 15 acquires coordinate of each object 60 in the display range (the predetermined time range). The coordinates are prepared in advance as described above. Next, in step S17, the sequence processing unit 15 acquires the path decided in the routine of FIG. 12 as the next moving path (when there is no change, the same path is acquired each time the routine is performed. In addition, when there is no change, step S17 may be skipped so that the same path as in the previous time can be used). Subsequently, in step S13, the sequence processing unit 15 calculates coordinates of the determination line 65. For example, this calculation is performed as follows. First, the sequence processing unit 15 specifies the coordinate of the object 60 positioned next on the moving path W acquired in step S17. Then, the sequence processing unit 15 determines the nearest operation timing in the sequence data 28 corresponding to the specified object 60, and determines the position of the determination line 65 on the corresponding moving path W in the time axis direction (that is, the moving direction of the determination line 65) of the moving path W decided in step S17 based on time difference between the nearest operation timing and the current time. Through this operation, it is possible to acquire the coordinates of the positions of the determination line 65 along the time axis on the moving path W at which the determination line 65 passes through the next object 60 at the nearest operation timing described in the sequence data 28. Further, steps S14 and S15 of the routine of FIG. 13 may be executed in the same manner as in the routine of FIG. 9. As a result of the routine of FIG. 13, when the movement distance from the object 60 corresponding to the next operation timing is long, the movement of the determination line 65 is displayed fast, whereas when the movement distance from the object 60 corresponding to the next operation timing is short, the movement of the determination line 65 is displayed slowly. Through this operation, the moving speed of the determination line 65 is adjusted. In addition, the routine of FIG. 12 can be applied when the objects 60 are arranged on a plurality of paths W along which the determination line 65 moves. In this case, in order to acquire the coordinate of each object 60, the routine of FIG. 12 may be configured such that in step S5, the path data 29 is acquired, and the arrangement coordinate of each object 60 previously set for each path W is used. Through this operation, even when the objects 60 are arranged on a plurality of moving paths W of the determination line 65, the moving speed can be adjusted through the routine of FIG. 13. In other words, even when the objects 60 are arranged on a plurality of moving paths W of the determination line 65, a distance between the objects 60 arranged on the moving path W can be flexibly set.

As described above, the present invention is not limited to the embodiment in which the determination line 65 passes through the operation indication marks arranged on the moving path along the path. The moving direction and the moving speed of the determination line 65 may be decided such that the determination line 65 sequentially passes through the operation indication marks at the operation timing described in the sequence data 28 based on the position of the operation indication mark and the position of the determination line 65. In other words, the operation indication mark may be arranged on the game screen in an arbitrary manner. Even in this case, since it is possible to change the displacement direction or the displacement speed between the operation indication marks, it is possible to provide the element of surprise to the development of the game.

In the above embodiments, the predetermined time period is used as a predetermined condition, but the present invention is not limited to this embodiment. For example, a predetermined operation on the determination line or the like may be employed as a predetermined condition, and the moving direction of the determination line or the like may be changed according to the predetermined operation. Further, an option for changing the determination line may be prepared, and the moving direction of the determination line or the like may be changed according to a game circumstance, a progress state, or the like. Furthermore, the moving direction of the determination line or the like may be changed according to the player's level.

In the above embodiments, the touch panel is used as the input device, but the input device is not limited to this embodiment. For example, as long as at least one operating unit is disposed, there may be used input devices having various configurations such as a controller in which a plurality of push buttons serving as an operating unit are provided.

In the above embodiments, the game machine 1 is configured as a music game machine in which music is reproduced, and an operation indication mark moves toward an operation reference portion based on a played time of the music. However, the present invention is not limited to this embodiment. The game machine 1 can provide various kinds of games as long as operation timing is indicated through a video. Furthermore, the game system of the invention may be actualized in appropriate embodiments such as a game machine for business use installed in commercial facilities, a stationary game machine for home use, a portable game machine, or a game system implemented using a network.

REFERENCE SIGNS LIST

1: Game machine
3: Monitor (display device)
5: Touch panel (input device and operating unit)
14: Speaker (audio output device)
10: Control unit (computer, operation timing determining device, indication mark display device, reference mark control device, and evaluating device, music reproducing device)
20: External storage device (music data storage device and sequence data storage device)
21: Game program
22: Game data
25: Music data
28: Sequence data
50: Game screen
60: Object (operation indication mark)
65: Determination line (operation reference mark and operating unit)
W, W1, and W2: Path (plurality of paths)

What is claimed is:

1. A game system comprising:
a display device that displays and outputs a game screen;
an input device that includes at least one operating unit;
a sequence data storage device that stores sequence data in which operation timing on the operating unit during a game is described;
an operation timing determining device that determines the operation timing of the operating unit included in a predetermined time range from a current time to the future in the game based on the sequence data;
an indication mark display device that causes an operation indication mark corresponding to each operation timing determined by the operation timing determining device to be displayed on the game screen; and
a reference mark control device that causes an operation reference mark corresponding to a current time to be displayed on the game screen while causing the corresponding operation reference mark to move on the game screen such that the corresponding operation reference mark sequentially passes through operation indication marks at operation timings described in the sequence data, wherein
the reference mark control device changes at least a moving direction of the operation reference mark according to a predetermined condition.

2. The game system according to claim 1, wherein the reference mark control device changes at least one of the moving direction and the moving speed of the operation reference mark at interval of predetermined time period using the predetermined time period as the predetermined condition.

3. The game system according to claim 1, wherein the indication mark display device causes the operation indication marks to be displayed in a line in time order along a plurality of paths, and the reference mark control device changes the at least one of the moving direction and the moving speed of the operation reference mark by displaying the operation reference mark while moving the operation reference mark along one of the plurality of paths and changing a moving path of the operation reference mark to another path among the plurality of paths according to the predetermined condition.

4. The game system according to claim 1, wherein a touch panel arranged on the display device so as to cover the game screen is used as the input device.

5. The game system according to claim 1, further comprising an evaluating device that evaluates an operation in at least one operating unit based on timing of an operation on the operating unit and the operation timing designated in the sequence data.

6. The game system according to claim 1, further comprising:
an audio output device that reproduces and outputs a game sound;
a music data storage device that stores music data for reproducing a music; and a music reproducing device that causes the audio output device to reproduce the music based on the music data, and wherein the operation timing of the operating unit during reproduction of the music is described in the sequence data.

7. A control method of controlling a computer which is incorporated in a game system comprising: a display device that displays and outputs a game screen; an input device that includes at least one operating unit; a sequence data storage device that stores sequence data in which operation timing on the operating unit during a game is described, wherein the control method of controlling the computer comprises the steps:

an operation timing determining step that determines the operation timing of the operating unit included in a predetermined time range from a current time to the future in the game based on the sequence data;

an indication mark display step that causes an operation indication mark corresponding to each operation timing determined in the operation timing determining step to be displayed on the game screen;

a reference mark control step that causes an operation reference mark corresponding to a current time to be displayed on the game screen while causing the corresponding operation reference mark to move on the game screen such that the corresponding operation reference mark sequentially passes through operation indication marks at operation timings described in the sequence data; and a step that changes at least a moving direction of the operation reference mark according to a predetermined condition in the reference mark control step.

8. A non-transitory storage medium storing a computer program for a game system comprising: a display device that displays and outputs a game screen; an input device that includes at least one operating unit; a sequence data storage device that stores sequence data in which operation timing on the operating unit during a game is described, wherein the computer program is configured to cause a computer which is incorporated in the game system to serve as:

an operation timing determining device that determines the operation timing of the operating unit included in a predetermined time range from a current time to the future in the game based on the sequence data;

an indication mark display device that causes an operation indication mark corresponding to each operation timing determined by the operation timing determining device to be displayed on the game screen; and a reference mark control device that causes an operation reference mark corresponding to a current time to be displayed on the game screen while causing the corresponding operation reference mark to move on the game screen such that the corresponding operation reference mark sequentially passes through operation indication marks at operation timings described in the sequence data, and the computer program is configured to further cause the reference mark control device to serve as a device that changes at least a moving direction of the operation reference mark according to a predetermined condition.

9. The game system of claim 1, wherein the reference mark control device changes the moving direction of the reference mark and further a moving speed of the operation reference mark, according to the predetermined condition.

10. A game system, comprising:

a display device that displays and outputs a game screen;
an input device that includes at least one operating unit;
a sequence data storage device that stores sequence data in which operation timing on the operating unit during a game is described;

an operation timing determining device that determines the operation timing of the operating unit included in a predetermined time range from a current time to the future in the game based on the sequence data;

an indication mark display device that causes an operation indication mark corresponding to each operation timing determined by the operation timing determining device to be displayed on the game screen; and a reference mark control device that causes an operation reference mark corresponding to a current time to be displayed on the game screen while causing the corresponding operation reference mark to move on the game screen such that the corresponding operation reference mark sequentially passes through operation indication marks at operation timings described in the sequence data, wherein the reference mark control device changes at least one of a moving direction and a moving speed of the operation reference mark according to a predetermined condition, wherein the indication mark display device causes the operation indication marks to be displayed in a line in time order along a plurality of paths, and the reference mark control device changes the at least one of the moving direction and the moving speed of the operation reference mark by displaying the operation reference mark while moving the operation reference mark along one of the plurality of paths and changing a moving path of the operation reference mark to another path among the plurality of paths according to the predetermined condition.

* * * * *